United States Patent
Humphries et al.

(10) Patent No.: US 9,462,791 B2
(45) Date of Patent: Oct. 11, 2016

(54) LIQUID RESERVOIR AND BIRD FEEDER INCORPORATING THE SAME

(71) Applicant: WOODSTREAM CORPORATION, Lititz, PA (US)

(72) Inventors: Romilly Humphries, South Bristol, ME (US); William R. Vaughn, Jr., Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 115 days.

(21) Appl. No.: 14/327,301

(22) Filed: Jul. 9, 2014

(65) Prior Publication Data

US 2015/0013612 A1 Jan. 15, 2015

Related U.S. Application Data

(60) Continuation of application No. 13/472,265, filed on May 15, 2012, now Pat. No. 8,800,490, which is a division of application No. 12/003,151, filed on Dec. 20, 2007, now Pat. No. 8,201,519.

(51) Int. Cl.
*A01K 39/04* (2006.01)
*A01K 39/02* (2006.01)

(52) U.S. Cl.
CPC .......... *A01K 39/04* (2013.01); *A01K 39/0206* (2013.01); *Y10T 29/49817* (2015.01)

(58) Field of Classification Search
CPC ............ A01K 5/00; A01K 5/01; A01K 7/00; A01K 39/0206; A01K 39/04; A01K 39/00; A01K 39/01

USPC .......... 119/51.01, 51.5, 52.1, 52.2, 52.4, 53, 119/56.1, 57.8, 72, 52.3

See application file for complete search history.

(56) References Cited

U.S. PATENT DOCUMENTS

| | | |
|---|---|---|
| D20,449 S | 1/1891 | Fletcher |
| 609,755 A | 8/1898 | Chapin |
| D51,997 S | 4/1918 | Vaughn |
| D200,317 S | 2/1965 | Etnyre |
| 4,441,457 A | 4/1984 | Sanford |
| 4,632,061 A | 12/1986 | Tucker et al. |
| 4,732,112 A | 3/1988 | Fenner et al. |
| 4,767,088 A | 8/1988 | Fielder et al. |
| 4,977,859 A | 12/1990 | Kilham |
| 5,044,319 A | 9/1991 | Blasbalg |
| 5,062,388 A | 11/1991 | Kilham |
| 5,140,945 A | 8/1992 | Barnhart et al. |
| 5,195,460 A | 3/1993 | Loken |
| 5,253,609 A | 10/1993 | Partelow et al. |

(Continued)

FOREIGN PATENT DOCUMENTS

| | | |
|---|---|---|
| FR | 2818498 | 6/2002 |
| JP | 5990361 | 6/1984 |
| JP | 62060175 | 4/1987 |

*Primary Examiner* — Trinh Nguyen
(74) *Attorney, Agent, or Firm* — Jacobson Holman, PLLC.

(57) ABSTRACT

A nutrient dispensing apparatus for birds having a hanger and two interchangeable dispensers supported by the hanger. Each dispenser includes a bottle for holding liquid or solid nutrients, and at least one basin into which the liquid or solid nutrients, water and bird feed, for example, are made available to the birds. The user can change the configuration of the dispensers as desired to provide just liquid nutrients, just solid nutrients or both. The flow rates for dispensing of the nutrients are different for each nutrient alternative.

17 Claims, 18 Drawing Sheets

(56) References Cited

U.S. PATENT DOCUMENTS

| | | |
|---|---|---|
| D341,911 S | 11/1993 | Thomsen |
| 5,259,336 A | 11/1993 | Clark |
| 5,423,291 A | 6/1995 | Daugherty |
| 5,823,135 A | 10/1998 | Gilchrist et al. |
| D420,177 S | 2/2000 | Jones |
| 6,386,142 B1 | 5/2002 | Holscher et al. |
| D459,840 S | 7/2002 | Lian |
| 6,863,025 B2 | 3/2005 | Ness |
| D521,194 S | 5/2006 | Weiland |
| 7,185,606 B1 | 3/2007 | Racine |
| 7,549,392 B2 | 6/2009 | Wechsler |
| 7,918,184 B2 * | 4/2011 | Humphries ............ A01K 39/04 119/51.5 |
| 8,683,947 B2 * | 4/2014 | Humphries ............ A01K 39/04 119/51.5 |
| 2005/0028743 A1 | 2/2005 | Wechsler |
| 2006/0196433 A1 | 9/2006 | Ness |
| 2008/0127900 A1 | 6/2008 | Humphries et al. |
| 2008/0156269 A1 | 7/2008 | Greenwood et al. |
| 2009/0260575 A1 | 10/2009 | Wechsler |
| 2012/0318200 A1 | 12/2012 | Van Dyk et al. |
| 2013/0092091 A1 | 4/2013 | Gauker et al. |

* cited by examiner

LIQUID RESERVOIR AND BIRD FEEDER INCORPORATING THE SAME

This application is a continuation of co-pending U.S. application Ser. No. 13/472,265, filed May 15, 2012, which was a divisional of U.S. application Ser. No. 12/003,151, filed on Dec. 20, 2007, which issued as U.S. Pat. No. 8,201,519 on Jun. 19, 2012, the priority of which is hereby claimed.

BACKGROUND OF THE INVENTION

1. Field of the Invention

The present invention is related to the field of animal feeding and watering devices and, more particularly, to a device for providing food and water to birds.

2. Description of the Related Art

Bird watching is a highly prevalent past time in both urban and rural areas. The world is full of birds of numerous varieties in an astounding array of colors and designs. Many people enjoy viewing birds of various types, and an industry has evolved around products directed to improving the ability of persons to closely observe birds in their natural environment. On one hand, many people venture into the outdoors, where binoculars and spotting scopes may be utilized to better view various birds in their natural habitats. Such an approach requires a certain degree of skill, however, in finding and spotting various species of birds. Another approach utilizes various means of attracting birds to one's residence or a desired viewing location, such as adjacent a home's porch or window, where birds may be viewed at one's leisure. For example, persons have used bird feeders, birdbaths, and the like to attract birds of various types to their homes.

Providing birds with food is, perhaps, one of the simplest ways of attracting wild birds, especially in the winter months when food is scare. There are a variety of seed dispensing bird feeders existing on the market today that are constructed to dispense common foodstuffs such seeds, grains, suets, and nectars. Certain varieties of birds will be attracted to certain foodstuffs, and thus the selection of a particular type of foodstuff and related food dispensing bird feeder results in the attraction of a particular variety of bird.

Another simple and perhaps more effective way of attracting birds is to make water available to them. Birds must drink water to avoid dehydration and, since they do not have salivary glands, birds need water to digest their food. Birds also need water for bathing, which helps keep their feathers functioning for regulating their body temperature. Birds feeding at the bird feeder will oftentimes also be attracted to the open water. In addition, open water will attract insect eating birds that do not feed on seed such as bluebirds, robins, and flycatchers to name a few. Accordingly, open water enhances the variety of birds one is able to attract.

Simply setting out a shallow bowl or dish of water will attract birds. However, perhaps the most common and decorative way of making water available to birds is with a birdbath. Birdbaths are usually placed a top a pedestal and are shallow enough to allow the bird to stand in the water. Visiting birds will use the birdbath to both consume water and bathe.

There are several drawbacks associated with birdbaths. First, there is little protection of the water from the elements allowing it to evaporate or freeze depending upon the conditions, making the water unavailable. Further, most birdbath constructions provide the water as a standing, stagnant, open pool, which invites contaminates, formation of algae, and may serve as a breeding ground for mosquitoes. Birds that visit the birdbath often deposit fecal matter into the bath, which soils the water and makes it unhealthy and unattractive. In addition, many birdbaths are placed low enough to the ground, or in an unsafe location, such that cats can easily stalk and kill visiting birds.

In addition to the foregoing, space may be limited for hanging bird feeders as well as providing birdbaths, especially for individuals living in apartments with limited balcony space. For others, time and money may simply limit one's ability to acquire and maintain both bird feeders and birdbaths resulting in the selection of one over the other. In fact, it is estimated that the 60 million people who feed birds do not provide birds with water. As a result, birds spend a great deal of time and energy searching for available water sources at locations distant from their food source.

Efforts to solve the foregoing problems are set forth in U.S. Pat. Nos. 4,441,457 and 6,386,142 which respectively disclose a bird feeder stand supporting both a hummingbird liquid food dispenser and a seed dispenser, and a birding pole that supports both seed dispensers and a water dish or dispenser. Hence, both of these solutions include only dispensers that are limited to providing either food or water, affording the user with no flexibility in deciding which nutrient to provide in a given case as the dispenser dictates its content. And, since both of these solutions are fairly large in area requirement, users having limited space are still most likely to offer only a birdseed feeder as the alternative most commonly considered.

Another similar bird feeding apparatus is shown in FIG. 1 and disclosed in copending application, Ser. No. 11/547,719, which is commonly assigned to the present assignee. This apparatus 10 discloses two distinct dispenser types supported by respective arms 16 on a pole 12. The first dispenser 14 is configured to provide solid foods such as seeds, and the second dispenser 18 is configured to provide liquids. However, like the other devices shown in the prior art, the dispensers 14, 18 of this device 10 are also tailored to only one nutrient type and do not afford the user with a choice as to whether to offer a different type of nutrient.

Since water is an essential part of a bird's diet, there has long been a need for providing birds with not only food but also a water source that is protected from the elements, that is clean, and that makes efficient use of available space and time to maintain. The present invention is directed to meeting these needs.

SUMMARY OF THE INVENTION

Accordingly an object of the present invention is to provide a new and useful apparatus to serve as a water source and/or a food source for birds.

Another object of the present invention is to provide a single apparatus having dispensers that can each be easily converted to serve either bird food or water.

A further object of the present invention is to provide birds with a source of food and/or water that is protected from the elements.

Yet another object of the present invention is to provide a new and useful source of drinking water for birds that is easy to maintain and makes efficient use of space.

A still further object of the present invention is to provide a source of drinking water and/or food for birds that is elevated so as to keep the bird safe while visiting.

Still another object of the present invention is to provide a device that meets the liquid and solid nutrient requirements of birds in an integrated apparatus that is not complex in structure and which can be manufactured at low cost but yet efficiently dispenses both food and water.

In view of these and other objects, the present invention is directed to an apparatus having a hanger and two interchangeable dispensers that are adapted to dispense nutrients to birds. The hanger is adapted to support the apparatus from a support structure against the force of gravity. Each dispenser includes a reservoir or bottle for holding liquid or solid nutrients, and at least one basin into which the liquid or solid nutrients, water and bird feed, for example, are made available to the birds.

According to a first embodiment, each of the dispensers includes a reservoir or bottle with two threaded ends and two basins that are attached on either end of the bottle via the threads. One of the basins is adapted to receive and dispense water and the other basin is adapted to receive and dispense bird feed. Whichever basin is attached to the bottom of the bottle is the basin that is "in use", i.e., is the basin that is dispensing either food or water. The other basin, which, is attached to the top of the bottle, serves as a decorative top cover for attaching the dispenser to the hanger.

The solid nutrients dispensed may be a birdseed, birdseed mix or other type of seed and/or grain mixture palatable to birds being fed, while the liquid nutrient dispensed may be selected from water and a liquid solution containing sugar, minerals or vitamins. For ease of discussion herein, the terms "food" or "bird feed" or "seed" will be used to refer to any solid nutrient while the term "water" will be used to refer to any liquid nutrient.

According to a second embodiment, each dispenser includes a bottle with at least one threaded end, a basin with a threaded attachment well and a rotating ring. The bottle is open on one end that is threaded and closed on the other end, and is attached to the attachment well via the threads. The rotating ring fits around the basin well portion and is provided with open slots through which food or water is dispensed. Corresponding openings are provided in the basin attachment well. By rotating the ring clockwise or counter clockwise around the attachment portion, the open slots in the ring can be positioned so as to be fully aligned, partially aligned or out of alignment with the openings in the basin attachment well, thereby controlling the volume of food or water being dispensed from the bottle into the basin.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
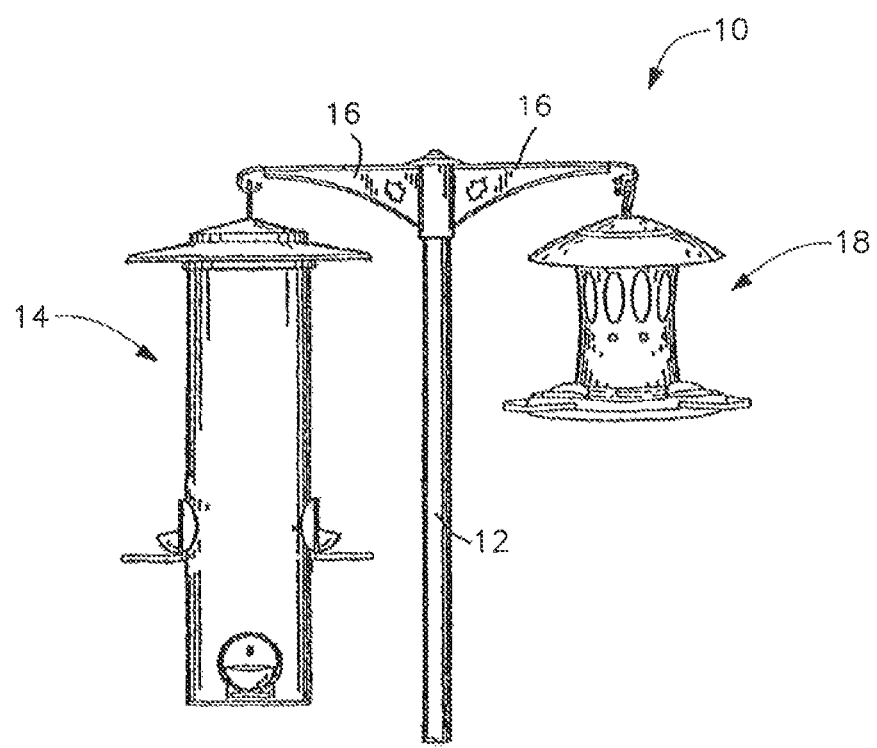
FIG. 1 illustrates a prior art bird feeding device having two dispensers supported by a pole, the first dispenser suitable for solid food and the other dispenser suitable for liquids.

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

According to the first embodiment illustrated in FIGS. 2-10 and generally designated by reference numeral 30, a decorative hanger 32 and two dispensers 34 are provided. Each of the dispensers 34 includes a bottle 36, a water basin 38, a seed basin 40, a top cap 42, a top connecting element 44, a bottom cap 46, and a bottom fastener 48.

Figure 4:
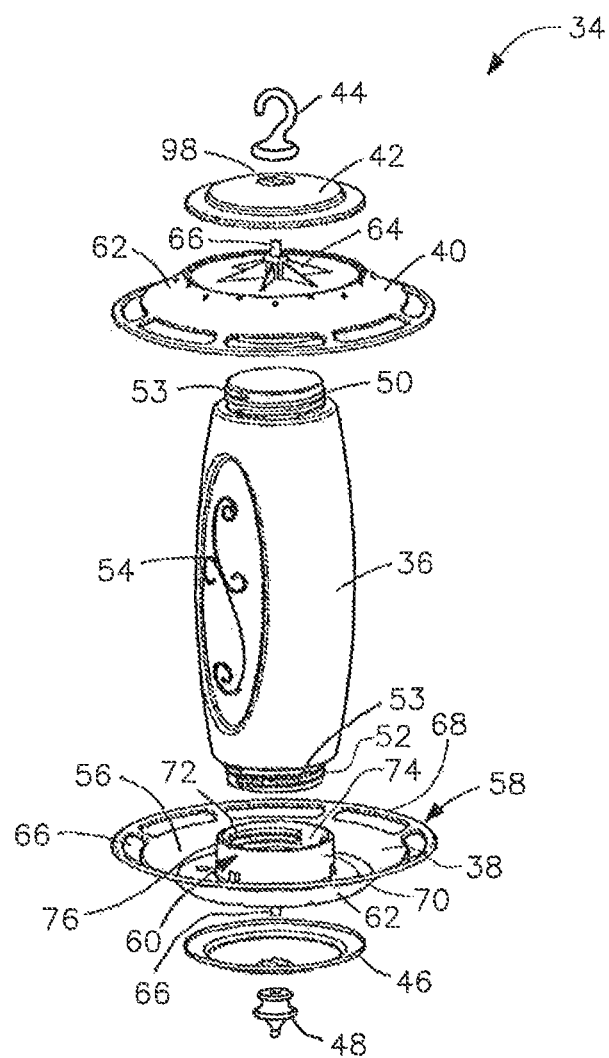
FIG. 4 is an exploded view of the components of the dispenser of FIG. 3.

As shown in FIG. 4, both the top end 50 and the bottom end 52 of the bottle 36 are similarly threaded externally, as at 53, with the top end 50 being closed and the bottom end 52 being open. The bottle 36 may be of virtually any shape and formed of any suitable material which allows feed and/or water to move downwardly toward the bottom end 52, and optionally may include ornamental features 54.

Figure 5:
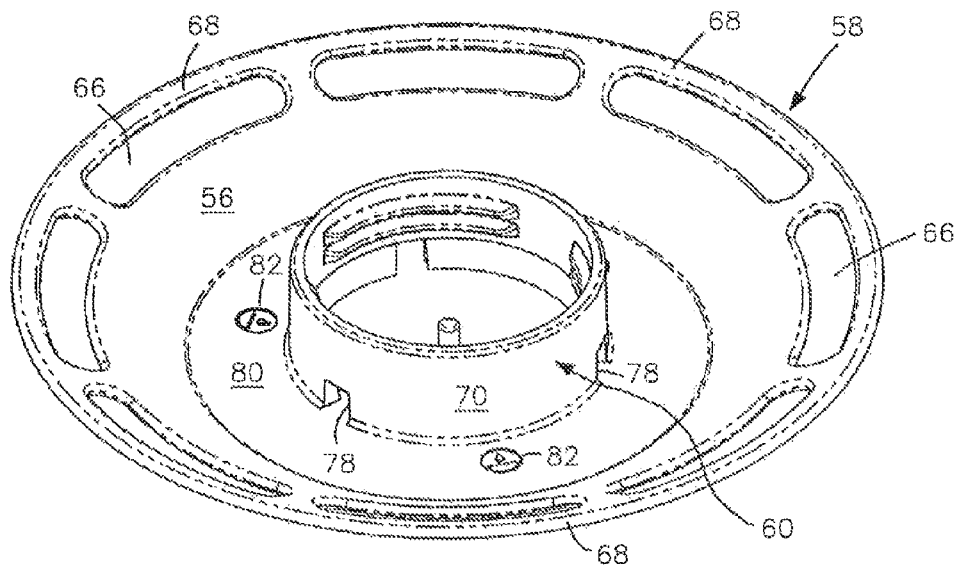
FIG. 5 is an enlarged view of the water basin in accordance with the first embodiment.

As shown in FIG. 5, the water basin 38 has a bowl-shaped water dispensing region 56, an outer edging generally designated by the reference numeral 58, and a threaded attachment collar generally designated by reference numeral 60, located centrally within the bowl-shaped water dispensing region 56. The outer surface 62 of the water dispensing region 56 includes a bolt mounting structure 64 (see the seed basin in FIG. 4 which has the same structure) for attachment to a bolt 66 that protrudes outwardly from the bolt mounting structure 64. The outer edging 58 of the water basin is preferably provided with openings 66 which form a rim 68 that can be used by birds as a perch.

The water basin threaded attachment collar 60 includes a generally cylindrical base 70 having threads 72 on an inner surface 74 thereof which mate with the threads 53. The cylindrical base is otherwise open or hollow in its center 76. The bottom of the base 70 adjacent the water dispensing region 56 has one or more water openings 78 therethrough that communicate between the hollow center 76 and the water dispensing region 56. The water openings 78 are relatively small in size to control the water flow. In addition, to assist the user, it is preferable to mark the inner surface 80 of the water dispensing region with a "water" symbol 82 that clearly distinguishes the water basin 38 from the seed basin 40.

Figure 6:
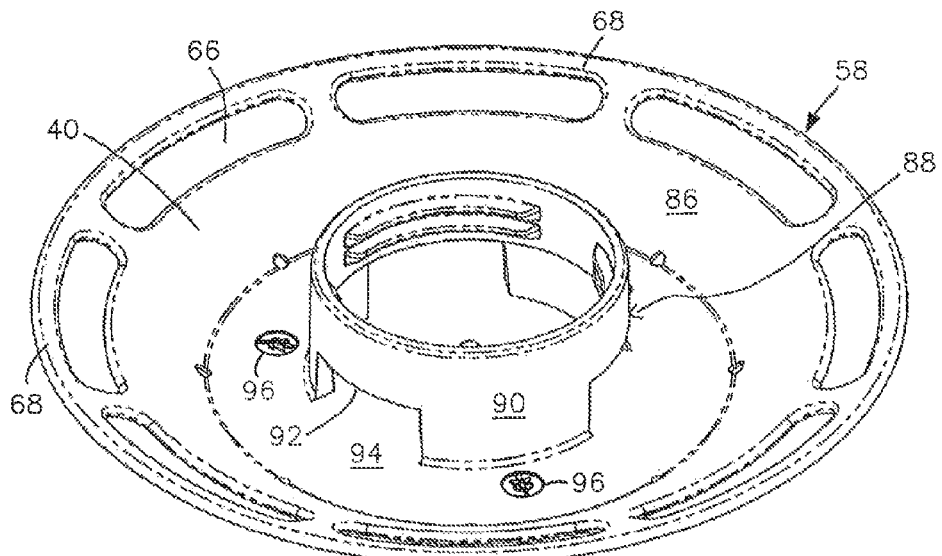
FIG. 6 is an enlarged view of the seed basin in accordance with the first embodiment.

As shown in FIG. 6, the seed basin 40 has a bowl-shaped seed dispensing region 86 and an internally threaded attachment collar generally designated by reference numeral 88 located centrally within the bowl-shaped seed dispensing region 86. Like the water basin, the outer edging 58 of the seed basin 40 is preferably provided with openings 66 forming a rim 68 that can be used by birds as a perch. Also like the water basin, the outer surface 62 of the seed dispensing region 86 includes a bolt mounting structure 64 for attachment to a bolt 66 that protrudes outwardly from the bolt mounting structure 64 (see FIG. 4).

Like that of the water basin, the seed basin threaded attachment collar 88 includes a generally cylindrical base 90 having threads on an inner surface thereof that mate with threads 53 of the bottle 36 and a hollow center (not shown). The bottom of the seed basin base 90 adjacent the seed dispensing region 86 is provided with one or more seed openings 92 therethrough that communicate between the seed base hollow center and the seed dispensing region. The seed openings 92 are larger than the water openings 78 to better allow seeds of varying sizes to flow into the seed dispensing region. As in the case of the water basin, it is preferable to mark the inner surface 94 of the seed dispensing region with a "seed" symbol 96 that clearly distinguishes the seed basin 40 from the water basin 38.

While the water and seed openings are shown to be generally rectangular, other opening shapes such as triangular, round, oval, etc. could also be used effectively. All that is needed is a hole of adequate size to allow water or the desired food to be dispensed into the relevant basin.

Each of the water and seed basins may be interchangeably attached to the threads 53 at either the top end 50 or the bottom end 52 of the bottle 36 by screwing the appropriate end of the bottle into the threaded attachment collar 60, 88 of the desired basin 38, 40. Whichever basin is attached to the bottom end of the bottle is the basin that is "in use", i.e., is the basin that dispensing either food or water. The other basin, which is attached to the top end of the bottle, serves as a decorative top cover for attaching the dispenser to the hanger.

The top cap 42 (see FIG. 4) is preferably a disc-shaped element having a centrally located aperture 98 for receiving the bolt 66 of either the water basin 38 or the seed basin 40. Once the bolt 66 has been inserted through the aperture 98, the top connecting element 44 is secured to the bolt. According to the embodiment shown in FIGS. 2-4 and 7-10, the top connecting element 44 is a hook having a threaded base that can be screwed onto the bolt 66 while locking the top cap 42 between the hook 44 and the seed basin 40. The hook is then used to hang the dispenser 34 from one of the arms of the hanger 32. As would be understood by persons of ordinary skill in the art, connecting elements of other types or configurations could also be used to secure the dispenser to the hanger or to hang the dispenser from the hanger.

The bottom cap 46 is constructed in the same way as the top cap 42, having a centrally located aperture (not shown) for receiving the bolt 66 of either the water basin or the seed basin. Once the bolt has been inserted through the aperture, the bottom fastener 48 is secured to the bolt 66. According to the embodiment shown in FIGS. 2-4, the bottom fastener 48 is a decorative nut or finial that can be screwed onto the bolt while locking the bottom cap 46 against the water basin 38. The bottom cap 46 and the decorative nut 48 are provided for aesthetic reasons in order to cover the projecting bolt 66 that is not being used to hang the dispenser 34 from the hanger 32.

Figure 7:
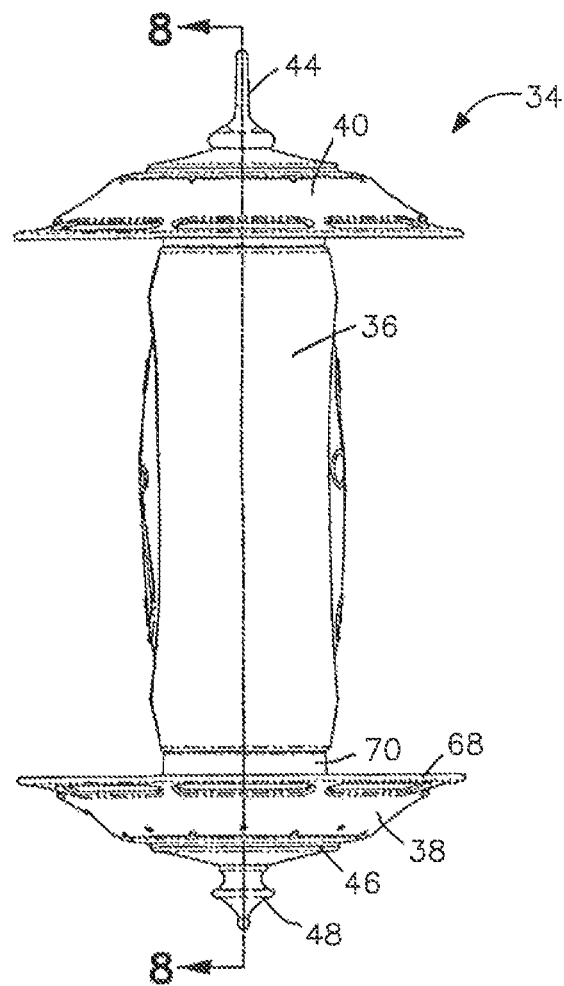
FIG. 7 is a side view of one of the dispensers of FIG. 2.
Figure 8:
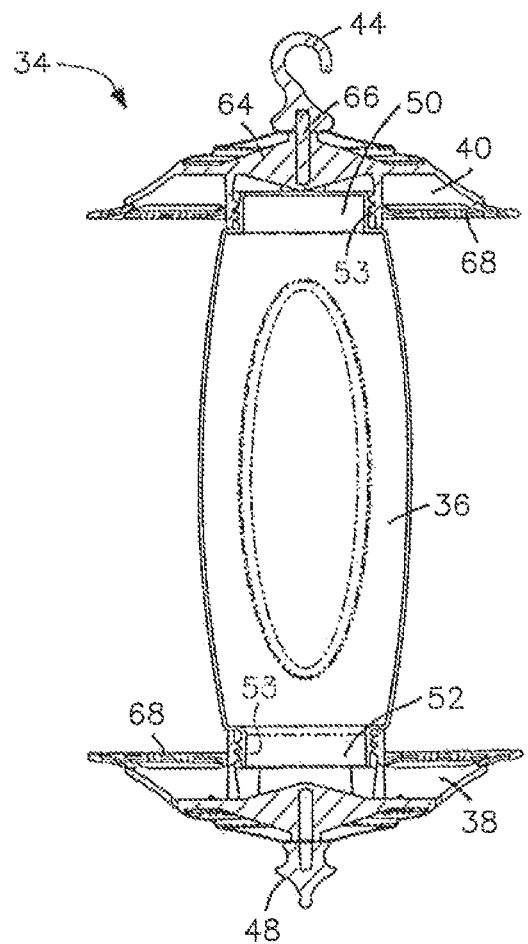
FIG. 8 is a cross-sectional view taken along line A-A of FIG. 7.
Figure 9:
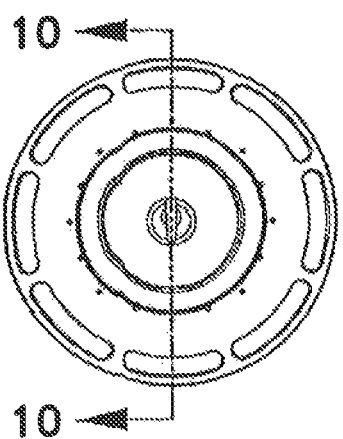
FIG. 9 is an end view of one of the dispensers of FIG. 2.
Figure 10:
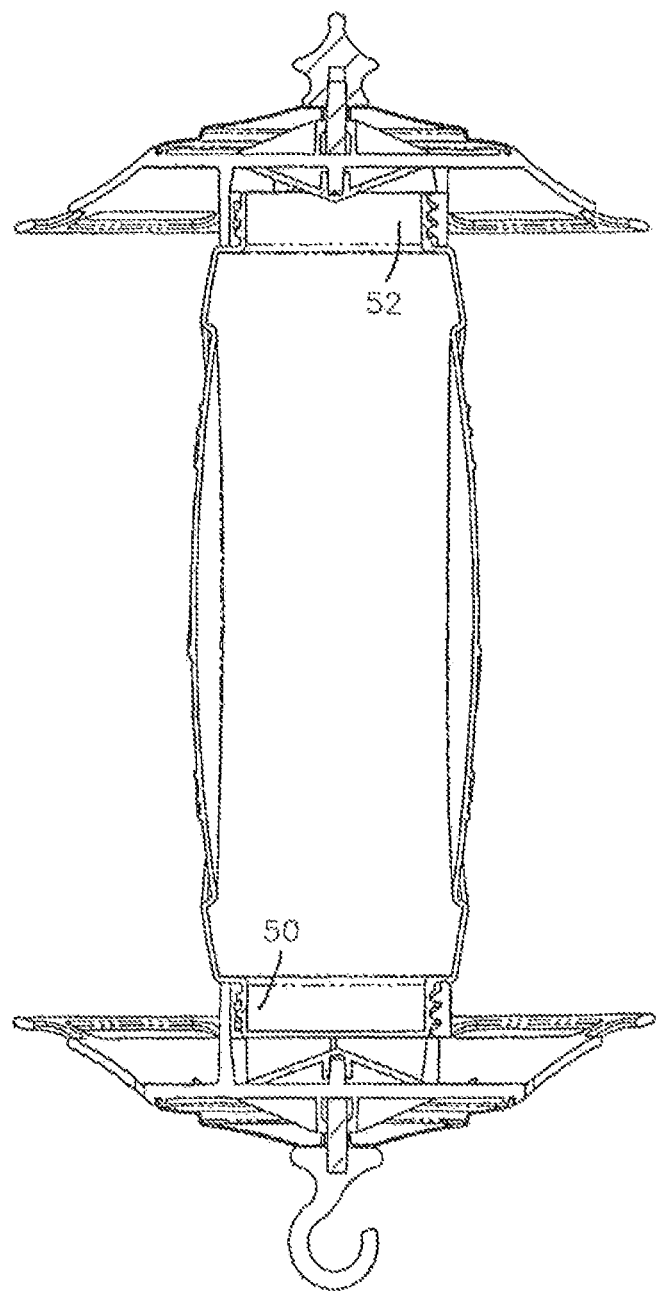
FIG. 10 is a cross-sectional view taken along line A-A of FIG. 9.

Side and cross-sectional views of the dispenser as assembled are provided in FIGS. 7 and 8, respectively; end and cross-sectional views of the dispenser are respectively provided in FIGS. 9 and 10.

Figure 2:
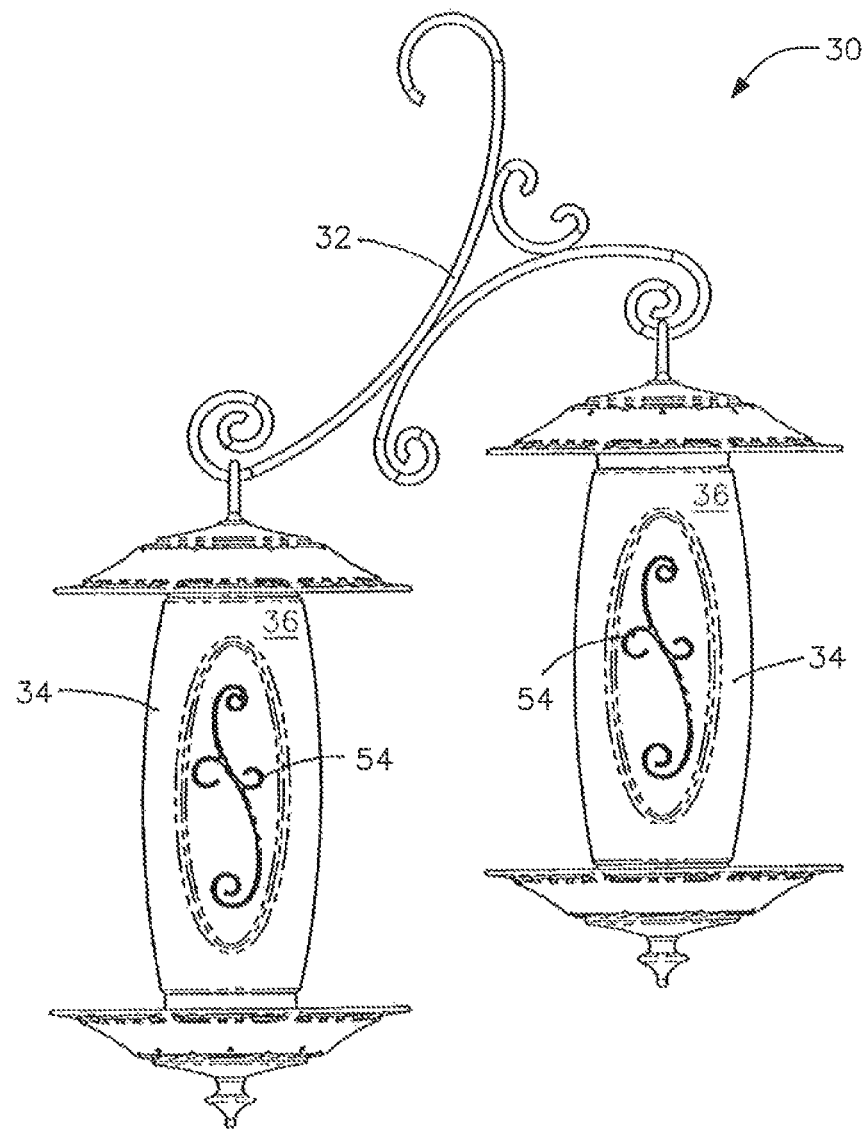
FIG. 2 illustrates a first preferred embodiment of a nutrient dispensing device with a decorative hanger and two offset-mounted dispensers, each dispenser having a separate water basin and seed basin, in accordance with the present invention.
Figure 3:
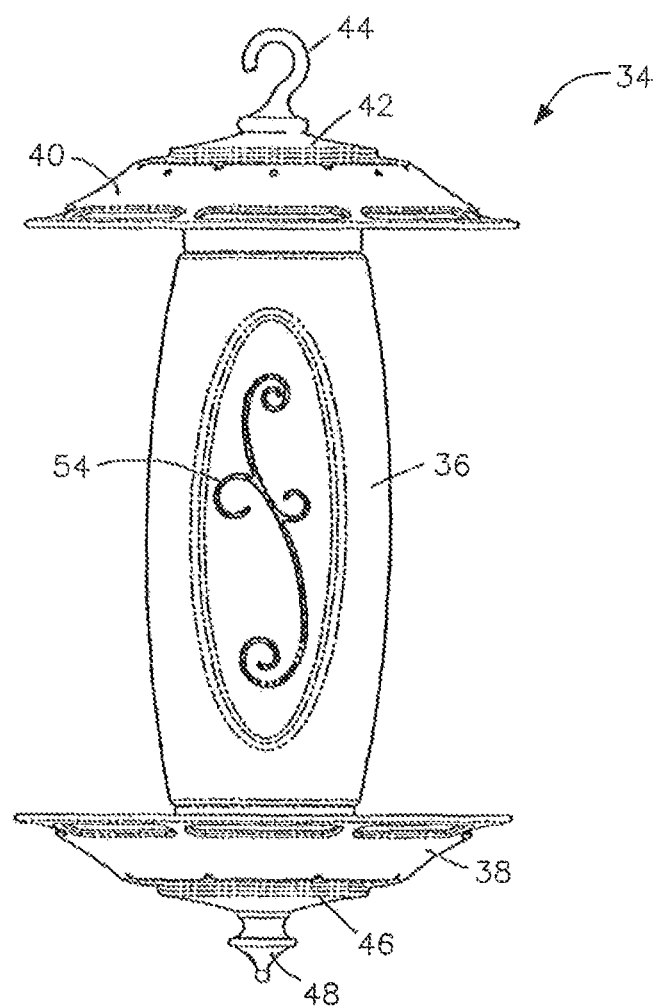
FIG. 3 shows an enlarged side view of one of the dispensers of FIG. 2 in accordance with the first embodiment.

As shown in FIG. 2, the hanger 32 is preferably able to support at least two dispensers 34 in a side-by-side relationship in which the dispensers may be at the same or different heights depending upon hanger design. The hanger 32 is preferably ornamental in appearance to increase the attractiveness of the bird feeding device.

The side-by-side relationship of the two dispensers allows both food and water to be offered in close proximity to one another. This close proximity is advantageous as birds are known to be slow to utilize new feeders, including those dispensing water, that are added in an existing feeding area but at some distance from a feeder that is already in use. By providing both dispensers in close proximity, about 12 inches or less of separation most typically, the birds will much more quickly adapt to using both dispensers and, in the case of the present invention, will make effective use of both the food and the water being offered within a short time.

Another advantage provided by the present invention is the interchangeability of offering either water or food from the same bottle and the opportunity this affords to quickly "educate" the birds to access both types of nutrients. Specifically, since food may prove to bathe best initial draw, a user of the nutrient dispensing device according to the present invention may begin by offering food in both dispensers. Once the birds are regularly obtaining food from both bottles, one of the bottles can be changed to offer water. Since the birds are already accustomed to using both bottles, they will naturally access the water without any delay. This benefit is not possible with prior art bird dispensing stations in which the food and water dispensers are capable of dispensing only food and water, respectively. Such single-use dispensers are also commonly made to be visibly different in appearance, which further slows initial acceptance and use of both dispenser by birds. With the present invention, by contrast, the dispensers are the same in appearance, eliminating any hesitancy on the birds' part to approaching a "different" feeder.

In use, the dispenser is removed from the hanger for filling. If the desired basin is already in position for nutrient dispensing, the water basin 38, for example, the top 50 of the bottle can remain secured to the seed basin 40 that is serving as the decorative top cover. The bottle is turned upside down so that the open bottom end 52 faces upward and the water basin 38 is unscrewed from the bottom end 52 of the bottle 36. The bottle is then filled with water, after which the water basin 38 is reattached to the open bottom end 52. The assembled dispenser 34 is then inverted and secured to the hanger 32 using the hook. The smaller size of the water openings is advantageous during this process as the water is constrained by the smaller holes so that less spilling will occur during the inversion process. The vacuum formed in the upper end of the bottle, as the water begins to flow, retards the water flow into region 56 of basin 38.

If the user wishes to change the dispenser from a water dispenser, as in the above example, to a seed dispenser, the feeder must be disassembled into the parts shown in the exploded view of FIG. 4. While this can be done in various orders, a preferred sequence is to first remove the hook 44 and the finial 48 and then switch and resecure them in reversed positions. The basins 38, 40 with their associated caps still connected thereto are then removed as assembled units. The water basin and the seed basin are then switched so that the seed basin 40 is adjacent the bottom end 52 of the bottle and the water basin 38 is adjacent the closed end. The closed end 50 of the bottle is screwed into the threaded collar 60 of the water basin which then serves as the decorative top cover. The bottle with the decorative top cover in place is then turned upside down and filled with seed, after which the assembled top cover unit, including the seed basin 40, is screwed onto the open bottom end 52 of the bottle. The dispenser is then inverted and secured to the hanger using the hook 44.

While the bottle is shown as being attached to each of the basins by the threaded collars, other attachment structures that allow for easy detachment and reattachment by the user, preferably without tools, could also be used effectively, as would be understood by persons of ordinary skill in the art.

According to the second embodiment illustrated in FIGS. 11-21 and generally designated by reference numeral 100, a decorative hanger 32 and two dispensers 102 are provided. Each of the dispensers 102 includes a reservoir or bottle 104, a basin 106, a rotating ring 108, a top cap assembly 110, and a bottom cap assembly 112. As shown, the dispensers 102 according to the second embodiment may be used with the same hanger 32 as already described in connection with the first embodiment.

Figure 13:
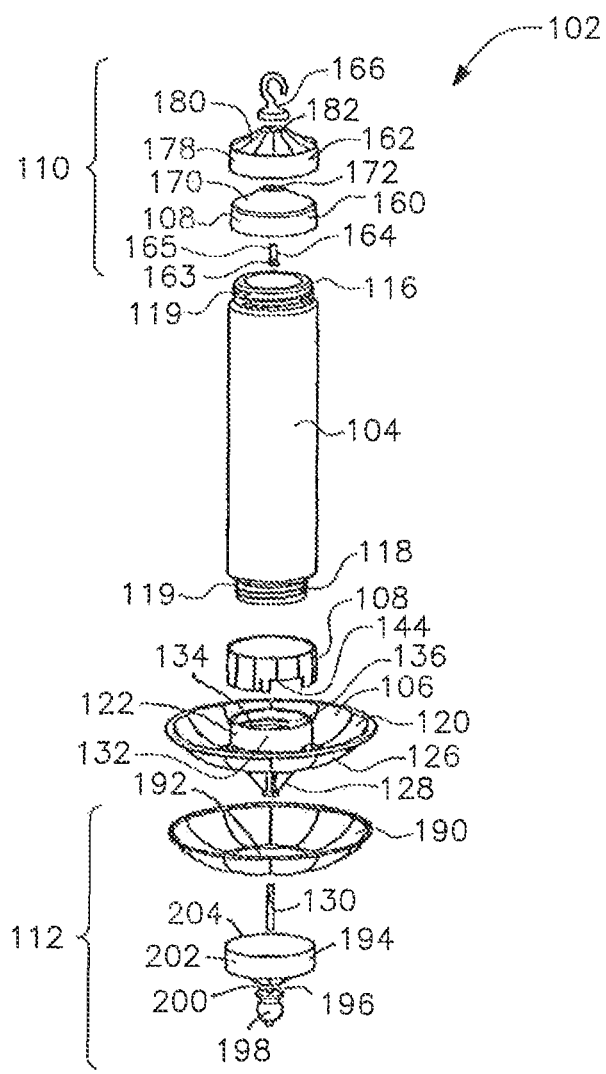
FIG. 13 is an exploded view of the components of the dispenser of FIG. 12.

As shown in FIG. 13, both the top end 116 and the bottom end 118 of the bottle 104 are externally threaded as at 119, with the top end 116 being closed and the bottom end 118 being open. The bottle 104 may be of virtually any shape and formed of any suitable material which allows feed or water to move downwardly toward the bottom end 118, and optionally may include ornamental features (not shown).

The basin 106 is capable of holding either seed or water in a bowl-shaped dispensing region 120. A threaded attachment collar generally designated by reference numeral 122 is located centrally within a substantially flat base 124 (see FIGS. 15-17) on the inside of the dispensing region 120. The outer surface 126 of the dispensing region 120 includes a bolt mounting structure 128 for attachment of a bolt 130 that protrudes outwardly from the bolt mounting structure 128. While not shown, the outer edging of the basin may be provided with openings to form a perch-type rim as included in the first embodiment.

The threaded basin attachment collar 122 includes generally cylindrical base 132 having threads 134 on an inner surface thereof which mate with the threads 119. The cylindrical base 132 is otherwise open or hollow in its center 136. The bottom of the base adjacent the dispensing region 120 has one or more openings generally designated by the reference numeral 138 (see FIG. 14) therethrough that communicate between the hollow center 136 and the dispensing region 120. While the openings 138 have a set size relative to the collar 122, the effective size of the openings 138 in use can be varied to suit the intended content of the dispenser as will be explained hereinafter.

The rotating ring 108 is an annular member having a wall with an inner diameter close to but slightly larger than the outer diameter of the cylindrical base 132 of the attachment collar 122 so as to fit thereover in a snug, friction-fit relationship. When so fitted for use, the bottom edge 140 of the ring (see FIGS. 15-17) is in abutment with the flat base 124 on the inside of the dispensing region 120. The ring 108 is preferably constructed to have seams 142 and/or an undulating surface to facilitate the user's grasp and corresponding ability to easily grip and rotate the ring.

The bottom edge 140 of the ring 108 has one or more openings or cutouts 144 that interrupt the bottom edge of the ring and provide for a user-selectable degree of communication between the hollow center of the collar 122 and the dispensing region 120 depending upon the rotational position of the ring 108. In the closed position shown in FIG. 15, the opening 138 in the collar 122 is completely out of alignment, with the cutout 144 in the ring so that the contents of the bottle are wholly contained within the bottle 104, i.e., no outflow can occur. As the ring 108 is rotated counter-clockwise from this position, flow is permitted at an increasing rate corresponding to the degree of alignment between the opening 138 in the collar 122 and the cutout 144 in the ring 108. FIG. 16 illustrates a partial alignment, while FIG. 17 shows the opening and the cutout in full alignment allowing maximum flow.

Figure 15:
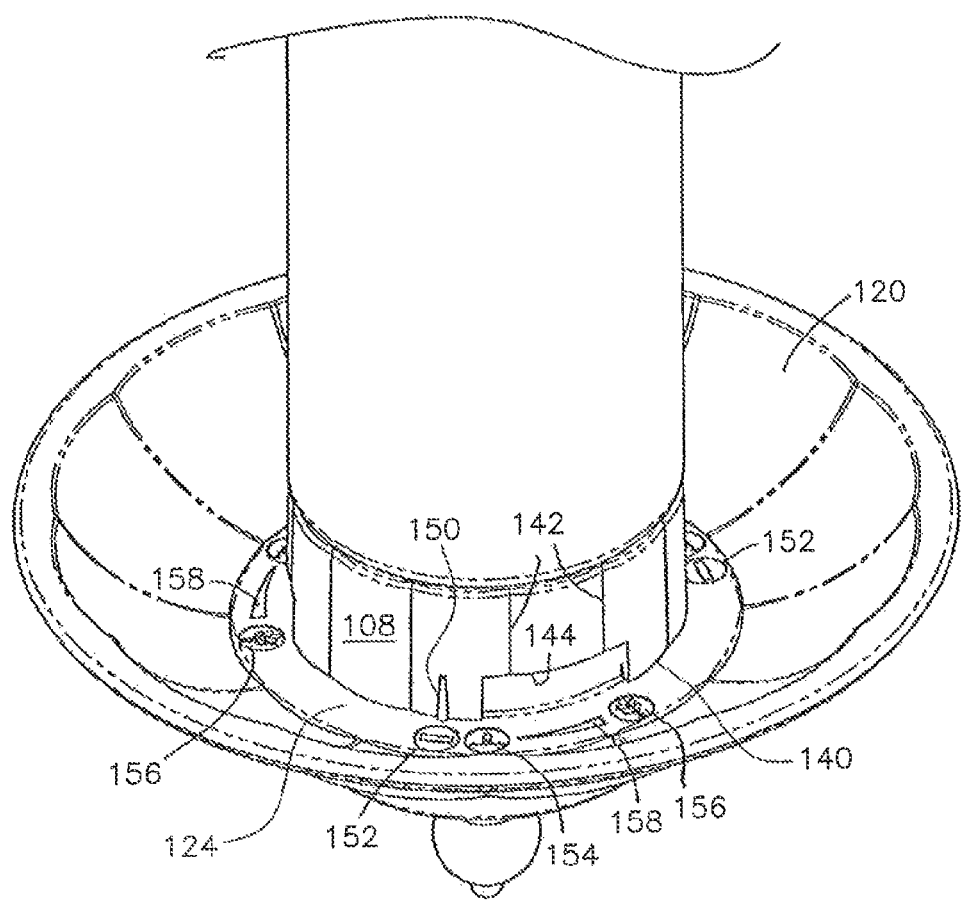
FIG. 15 is an enlarged top perspective view of the basin and rotating ring in accordance with the second embodiment, shown in a fully closed position.
Figure 16:
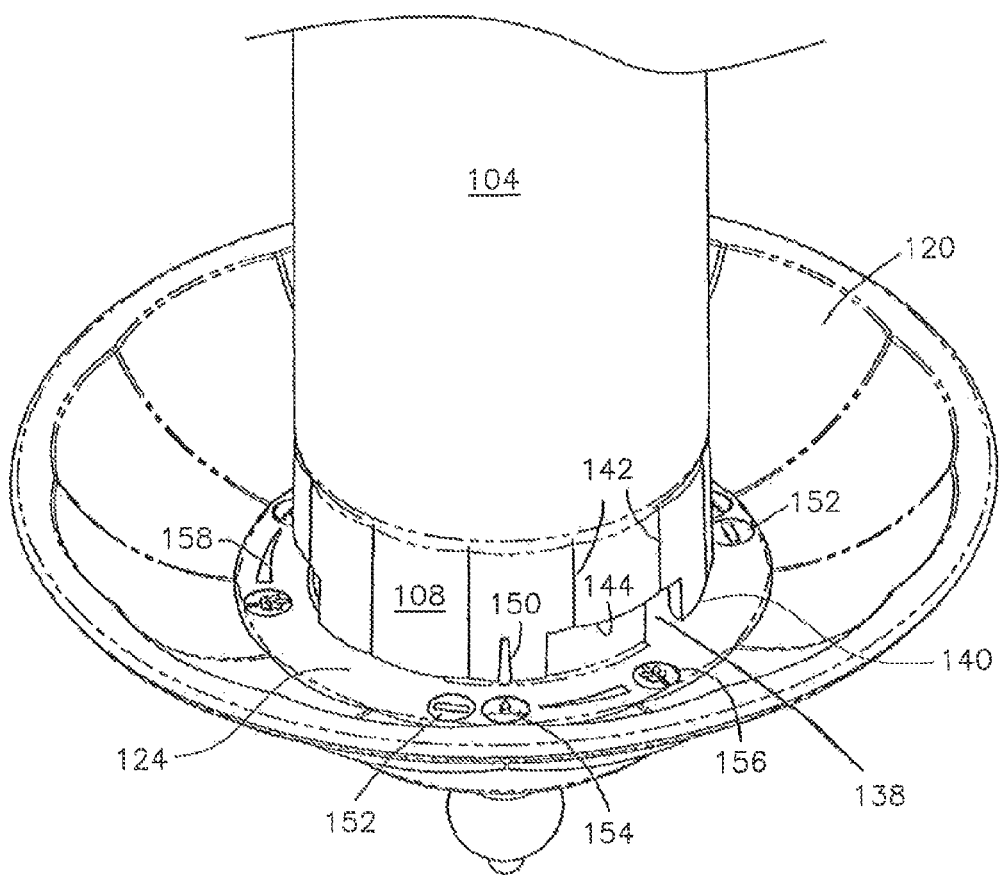
FIG. 16 is an enlarged top perspective view of the basin and rotating ring in accordance with the second embodiment, shown in a partially open position.
Figure 17:
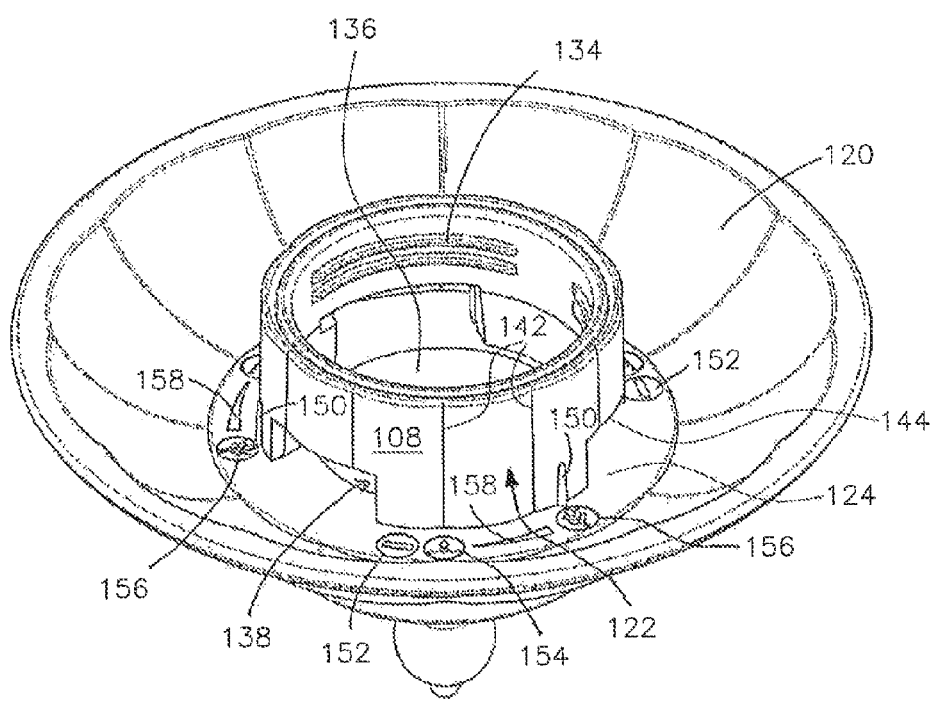
FIG. 17 is an enlarged top perspective view of the basin and rotating ring in accordance with the second embodiment, shown in a fully open position.
Figure 18:
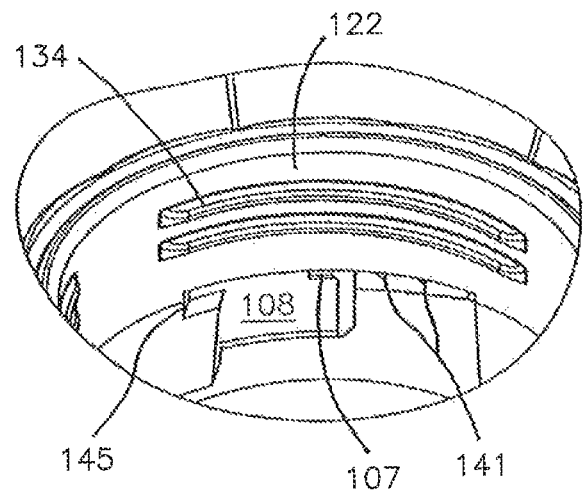
FIG. 18 shows an interior view of the collar and ring in accordance with the second embodiment, the ring being positioned with the cutout in a partially open position.

As shown in each of FIGS. 15-17, the rotating ring 108 preferably has at least one set mark 150 and the flat base 124 on the inside of the dispensing region 120 preferably is marked with at least one set of symbols to assist the user in achieving the desired flow setting. Each symbol set includes a fully closed symbol 152, a water flow setting symbol 154 and a food flow setting symbol 156. As the user rotates the rotating ring 108 to align the set mark 150 with one of the symbols 152, 154, 156, the degree of alignment between the collar opening 138 and the rotating ring cutout 144 that corresponds with the selected flow rate is achieved. A curved, elongated triangular symbol 158 is provided between the water and food flow setting symbols 154, 156 to graphically illustrate that as rotation of the ring 108 moves the set mark 150 along the continuum between these two symbols, the flow rate is gradually increased. While the water and food flow setting symbols 154, 156 identify suggested alignment positions for the nutrients represented, the user may, of course, select any position along the continuum represented by the symbol 158 between these two symbols as the in-use position.

Figure 14:
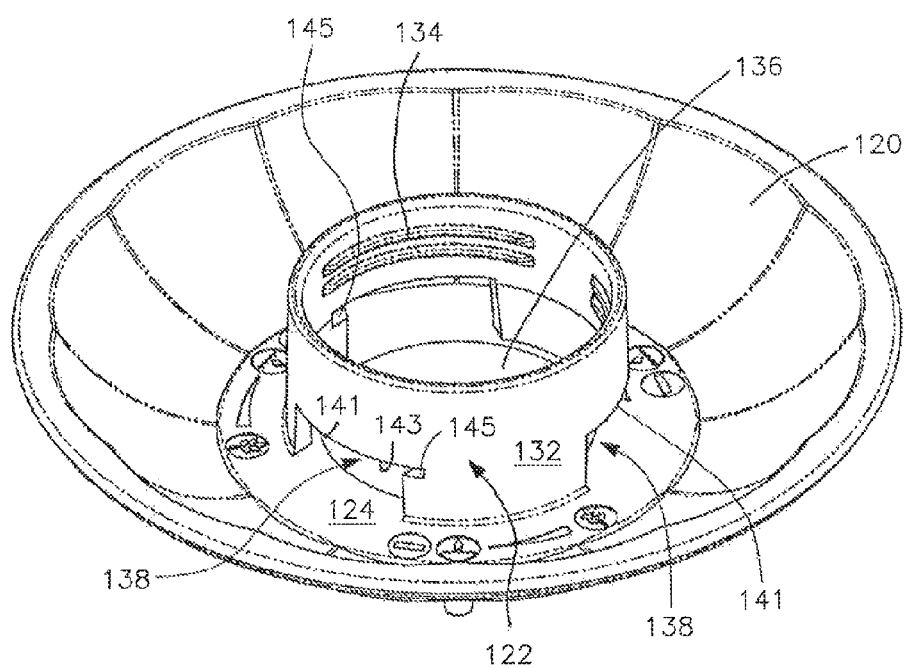
FIG. 14 is a top perspective view of the basin of the second embodiment without the rotating ring.
Figure 19:
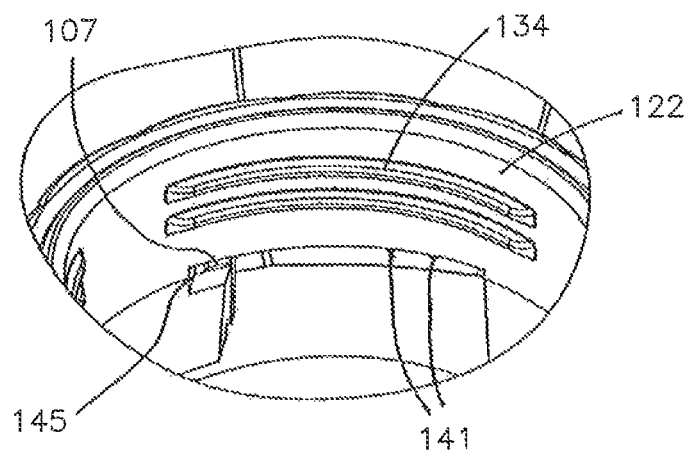
FIG. 19 shows another interior view as in FIG. 18 but with the ring being positioned with the cutout in the fully open position.
Figure 20:
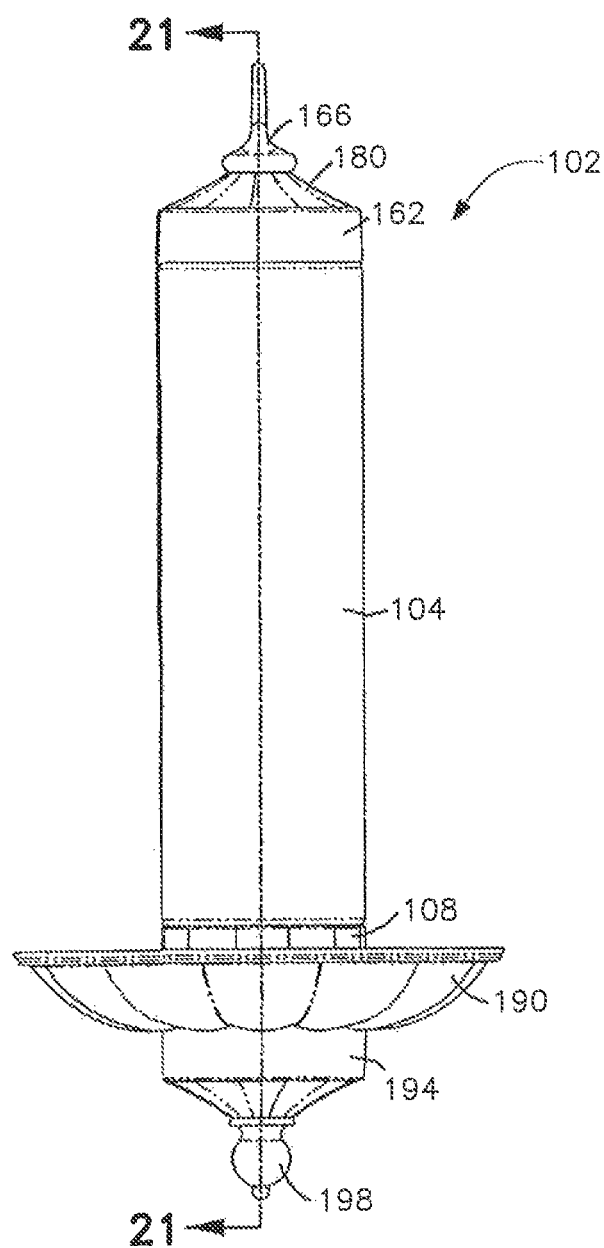
FIG. 20 is a side view of one of the dispensers of FIG. 11.
Figure 21:
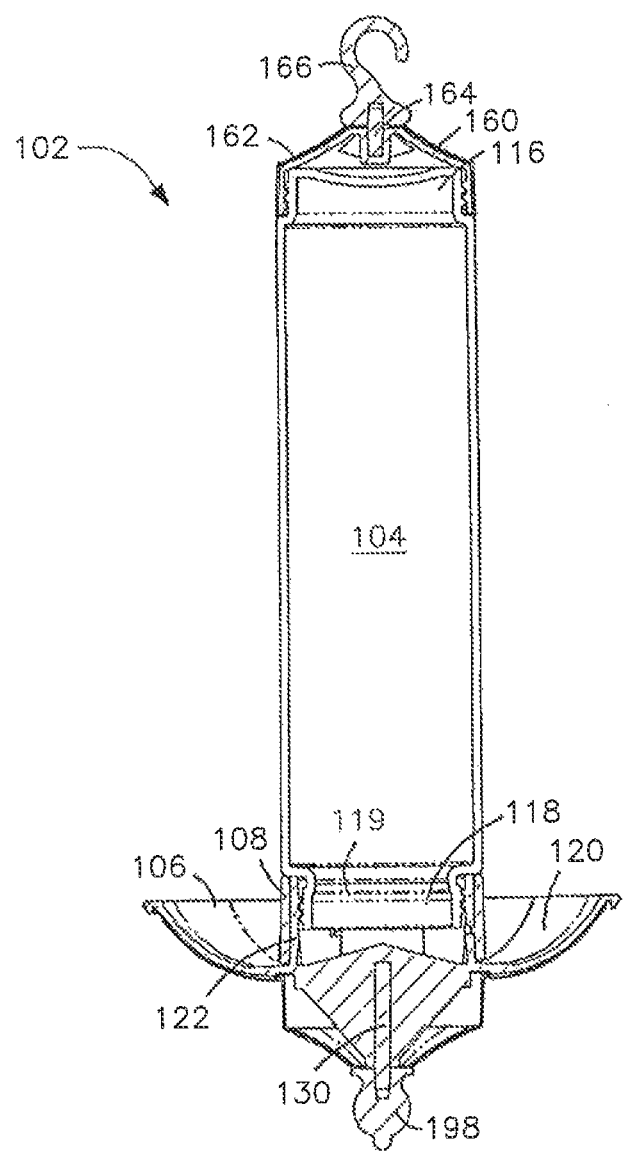
FIG. 21 is a cross-sectional view taken along line A-A of FIG. 20.

As shown in FIGS. 14, 13 and 19, the collar according to the second embodiment is preferably provided with protrusions or bumps 141 on the top edge 143 of the openings 138. These bumps come into frictional contact with a catch 107 formed on the inner surface 109 of the ring 108 to provide the user with a tactile indication of having reached a preferred flow setting through rotation of the ring. The catch 107 rests against a stop 145 formed on the collar when the ring is in the fully open position as shown in FIG. 19.

For increased ease of use, a preferred embodiment such as that shown includes a plurality of symbol sets, each with a corresponding set mark on the rotating ring (see, in particular, FIG. 17), so that the user can see and select the desired flow rate from various positions around the dispenser.

As shown in FIG. 13, the top cap assembly 110 includes a threaded cap 160, an ornamental cap 162, a fastener 164 and a hanging element 166. In the illustrated embodiment the fastener is a bolt having a head 163 and a threaded end 165 as is conventionally known. The hanging element 166 is a hook with a base having a threaded bore (not shown).

The threaded cap 160 has a generally cylindrical collar 168 with inside threads (not shown) that match the threaded top end 116 of the bottle, and an upper portion 170 having a centrally located aperture 172 through which the threaded end 165 of the bolt 164 passes. The head of the bolt 163 is sized so as not to pass through the aperture 172.

The ornamental cap 162, which also has a collar 178 and an upper portion 180 with a central aperture 182, is sized to fit over the threaded cap 160 in a nested relationship and has a design that preferably provides an ornamental appearance. The threaded end 165 of the bolt also passes through the central aperture 182 in the ornamental cap 162 upper portion so as to project therefrom. The hook element 166 is secured to the bolt 164 by screwing the projecting threaded end 165 into the threaded bore (not shown) of the hook element 166 to secure the elements of the top cap assembly together.

Once the threaded cap 160, the ornamental cap 162 and the hook element 166 have been secured to one another using the bolt 164, the resulting top cap assembly 110 is secured to the bottle 104 by screwing the collar of the threaded cap 168 onto the top end 116 of the bottle. The hook 166 is then ready to be used to hang the dispenser from one of the arms of the hanger.

The bottom cap assembly 112 includes a fluted ring 190 with an open center 192, a bottom cover 194 with a central aperture 196 and a fastener 198 with a threaded bore 200. The fluted ring 190 is decorative in appearance and is constructed to fit against the outer surface of the basin 106 and encircle the bolt mounting structure 128 which extends through the open center 192. The bottom cover 194 has a collar 202 with a diameter just larger than the open center 192 so that, when the bottom cap assembly 112 is assembled, the upper edge of the collar 204 is in abutment with the lower surface of the fluted ring 190 and covers the open center 192. The bolt 130, held by and projecting from the bolt mounting; structure 128, passes through the central aperture 196 in the bottom cover 194. The fastener 198 is secured to the bolt 130 by screwing the projecting end of the bolt into the fastener's threaded bore 200. In this way, the bottom cover 194 and the fluted ring 190 are locked against the basin 106 and provide a visually pleasing appearance to the base of the dispenser. Side and cross-sectional views of the dispenser as assembled are provided in FIGS. 20 and 21.

Figure 11:
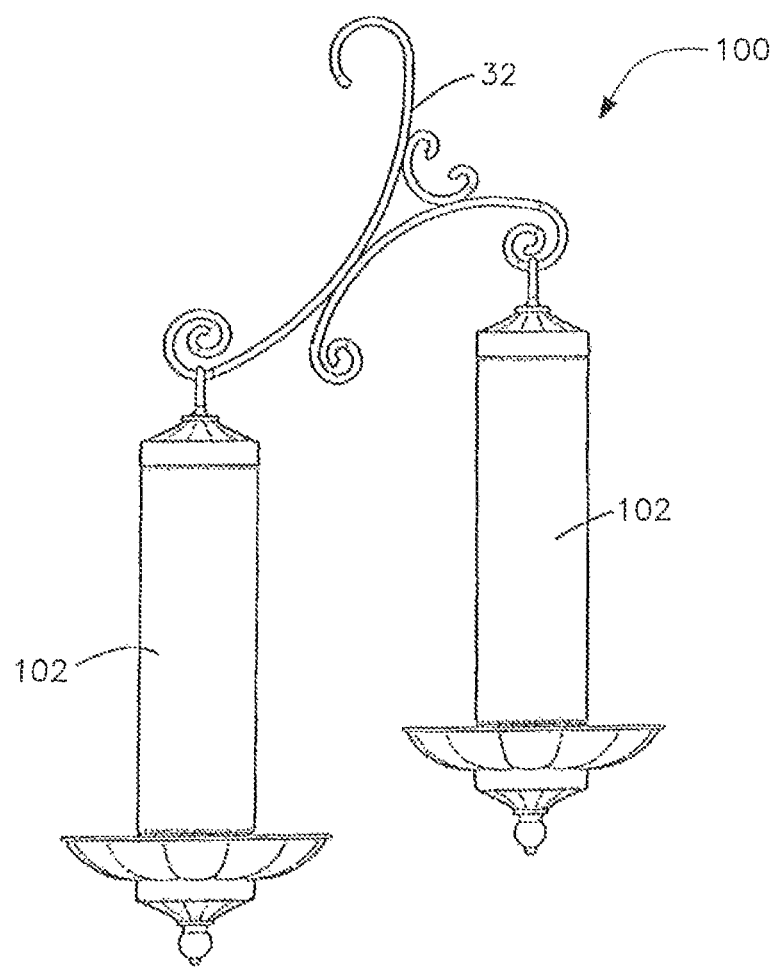
FIG. 11 illustrates a second preferred embodiment of a nutrient dispensing device with a decorative hanger and two offset-mounted dispensers, each dispenser having a single basin for both water and seed, in accordance with the present invention.
Figure 12:
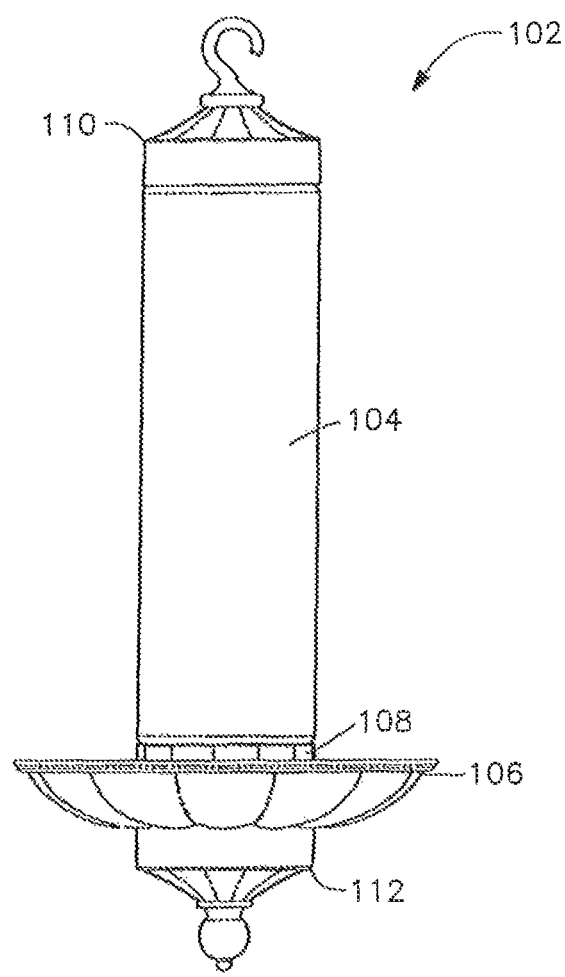
FIG. 12 shows an enlarged side view of one of the dispensers of FIG. 11.

As shown in FIG. 11, the hanger 32 is preferably able to support at least two dispensers 102 in a side-by-side relationship with the dispensers at the same or different heights depending upon hanger design. The hanger is preferably ornamental in appearance to increase the attractiveness of the bird feeding device.

The side-by-side relationship of the two dispensers allows both food and water to be offered in close proximity to one another which, as already discussed in connection with the first embodiment, is advantageous in overcoming the natural reticence of birds to try new feeders. By providing both dispensers in close proximity, typically 12 inches apart or less, the birds will much more quickly use both dispensers. The ease with which each dispenser can be changed from a feed dispenser to a water dispenser, and vice versa, also facilitates rapid avian learning as to the availability of both food and water, as also discussed in connection with the first embodiment.

In use, the dispenser 102 is removed from the hanger 32 for filling. The rotating ring 108 is rotated to the fully closed position as shown in FIG. 15 to prevent spillage and the bottle is turned upside down. The basin 106 is unscrewed from the bottom 118 of the bottle 104 and the bottle is then filled with water or food, after which the basin 106 is reattached to the open bottom end 118. The assembled dispenser 102 is then inverted and secured to the hanger 32 using the hook 166. A flow rate is then selected and established by rotating the ring 108 counter-clockwise to align the set mark 150 with either the liquid setting symbol 154 or the food setting symbol 156, depending upon the contents of the bottle.

If the user wishes to change the dispenser from a water dispenser to a seed dispenser, or vice versa, all that is necessary is to the fill the bottle with the appropriate nutrient followed by inversion while the openings are fully closed. Any flow rate from water to food, and anything in between, can then be selected by simply rotating the ring.

As in the first embodiment, attachment structures other than threaded ends may be used to attach the bottle to the basin and/or to the top cover assembly, provided such structures allow for easy detachment and reattachment by the user, preferably without tools.

With the foregoing embodiments, a bird feeder design is provided that allows the user to selectively dispense food and/or liquid nutrients in a combined apparatus that is attractive in appearance and compact in size. The feeder is easy to use and maintain, being made of durable materials that are lightweight and weather resistant such as molded plastic, PVC, PP, glass, steel, etc. Combinations of these and other materials may also be used as would be understood by persons of ordinary skill in the art. The feeder also provides a safe source of food and water that will effectively draw birds for the user's viewing and enjoyment.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A solid and liquid nutrient dispensing apparatus for animals comprising:
   a container adaptable to dispense first liquid nutrients and then solid nutrients, or vice versa, and being fully changeable therebetween thereafter, said container having an open end;
   a liquid nutrient basin having a liquid nutrient dispensing region and a base within said liquid nutrient dispensing region, said base configured to removably secure the liquid nutrient basin to said open end of said container to configure the container for dispensing liquid nutrients, said base having a sidewall with at least one liquid nutrient opening therein through which liquid nutrients in the container may flow into the liquid nutrient dispensing region when the liquid nutrient basin is secured to the open end of the container and the container is being used to dispense liquid nutrients; and
   a solid nutrient basin having a solid nutrient dispensing region and a base within said solid nutrient dispensing region, said base configured to removably secure the solid nutrient basin to said open end of said container to configure the container for dispensing solid nutrients, said base having a sidewall with at least one solid nutrient opening therein through which solid nutrients in the container may pass into the solid nutrient dispensing region when the solid nutrient basin is secured to the open end of the container and the container is being used to dispense solid nutrients, wherein said side wall in said solid nutrient basin base includes a generally cylindrical attachment collar extending upwardly from a central area of said solid nutrient dispensing region for securing said solid nutrient basin to said container, said solid nutrient basin base collar including a plurality of solid nutrient openings spaced around said collar, and wherein said side wall in said liquid nutrient basin base also includes a generally cylindrical attachment collar extending upwardly from a central area of said liquid nutrient dispensing region for securing said liquid nutrient basin to said container, said liquid nutrient basin collar including a plurality of liquid nutrient openings spaced from one another, said liquid nutrient openings being smaller than said solid nutrient openings.

2. The dispensing apparatus as set forth in claim 1, further comprising a second dispenser, wherein each of said dispensers is configured to dispense solid nutrients by attaching said solid nutrient basin to the open end of said container, and each of said dispensers being configured to dispense liquid nutrients by attaching said liquid nutrient basin to the open end of said container.

3. The dispensing apparatus as set forth in claim 1, wherein each of said collars has internal threads and said container open end has external threads, said container being secured within a respective one of said collars by rotating engagement of said external and said internal threads.

4. The dispensing apparatus as set forth in claim 3, wherein an upper end of said container has external threads, the liquid nutrient basin being attached to said upper end to provide an ornamental top when said solid nutrient basin is attached to said open end of said container and the container is configured for dispensing solid nutrients, and the solid nutrient basin being attached to said upper end to provide an ornamental top when said liquid nutrient basin is attached to said open end of the container and the container is configured for dispensing liquid nutrients.

5. The dispensing apparatus as set forth in claim 1, wherein an upper end of said container does not have an opening, both the upper end and the open end having threaded portions that interchangeably enrage with corresponding threaded portions of said basin collars.

6. The dispensing apparatus as set forth in claim 5, further comprising a hanger that is interchangeably connectable to either the liquid nutrient basin or the solid nutrient basin when attached to the upper end, of the container to suspend the feeder.

7. The dispensing apparatus as set forth in claim 6, wherein each of the liquid nutrient basin and the solid nutrient basin have a bolt extending outwardly from an outer surface thereof, the dispenser further comprising a top cap and a bottom cap, each cap having a hole therethrough to receive the bolt when the caps are placed against the outer surfaces of the basins, respectively.

8. The dispensing apparatus as set forth in claim 7, wherein the top cap is secured against whichever basin is on top of the dispenser with a hook that screws onto the bolt, the hook being configured to suspend the dispenser.

9. The dispensing apparatus as set forth in claim 8, wherein the bottom cap is secured against whichever basin is on the bottom of the dispenser with a decorative nut or filial.

10. A solid and liquid nutrient dispensing apparatus for animals comprising:
a container adaptable to dispense first liquid nutrients and then solid nutrients, or vice versa, and being fully changeable therebetween thereafter, said container having a dispensing end and a non-dispensing end;
a liquid nutrient basin having a liquid nutrient dispensing region and a liquid basin base within said liquid nutrient dispensing region, said liquid basin base configured to removably secure the liquid nutrient basin to said dispensing end of said container to configure the container for dispensing liquid nutrients, said liquid basin base having a sidewall with at least one liquid nutrient opening therein through which liquid nutrients in the container may flow into the liquid nutrient dispensing region when the liquid nutrient basin is secured to the dispensing end of the container and the container is being used to dispense liquid nutrients; and
a solid nutrient basin having a solid nutrient dispensing region and a solid basin base within said solid nutrient dispensing region, said solid basin base configured to removably secure the solid nutrient basin to said dispensing end of said container to configure the container for dispensing solid nutrients, said solid basin base having a sidewall with at least one solid nutrient opening therein through which solid nutrients in the container may pass into the solid nutrient dispensing region when the solid nutrient basin is secured to the dispensing end of the container and the container is being used to dispense solid nutrients, wherein said liquid basin base is configured to removably secure the liquid nutrient basin to either said non-dispensing end or said dispensing end of said container, and said solid basin base is configured to removably secure the solid nutrient basin to either said non-dispensing end or said dispensing end of said container, said solid nutrient basin being secured to the non-dispensing end of the container and the liquid nutrient basin being secured to the dispensing end of the container to configure the container for dispensing liquid nutrients, and said liquid nutrient basin being secured to the non-dispensing end of the container and the solid nutrient basin being secured to the dispensing end of the container to configure the container for dispensing solid nutrients.

11. The dispensing apparatus as set forth in claim 10, wherein said side wall in said solid nutrient basin base includes a generally cylindrical attachment collar extending upwardly from a central area of said solid nutrient dispensing region for securing said solid nutrient basin to said container, said collar including a plurality of solid nutrient openings spaced around said collar.

12. The dispensing apparatus as set forth in claim 11, wherein said side wall in said liquid nutrient basin base includes a generally cylindrical attachment collar extending upwardly from a central area of said liquid nutrient dispensing region for securing said liquid nutrient basin to said container, said liquid nutrient basin collar including a plurality of liquid nutrient openings spaced from one another, said liquid nutrient openings being smaller than said solid nutrient openings.

13. The dispensing apparatus as set forth in claim 10, further comprising a second dispenser, wherein each of said dispensers is configured to dispense solid nutrients by attaching said solid nutrient basin to the dispensing end of said container with said liquid nutrient basin being attached to said non-dispensing end to provide an ornamental top, and each of said dispensers being configured to dispense liquid nutrients by attaching said liquid nutrient basin to the dispensing and of said container with said solid nutrient basin being attached to said non-dispensing end to provide an ornamental top.

14. The dispensing apparatus as set forth in claim 11, wherein said collar has internal threads and said container dispensing end has external threads, said container being secured within said collar by rotating engagement of said external and said internal threads.

15. The dispensing apparatus as set forth in claim 14, wherein both the dispensing end and the non-dispensing end of said container have threaded portions that interchangeably engage with corresponding threaded. portions of said basin collars.

16. A nutrient dispensing apparatus for animals comprising:
   a container adaptable to dispense a first type of nutrients and then a second type of nutrients different from the first type of nutrients, or vice versa, and being fully changeable therebetween thereafter, said container having an open end;
   a first nutrient basin having a first nutrient dispensing region and a base within said first nutrient dispensing region, said base configured to removably secure the first nutrient basin to said open end of said container to configure the container for dispensing the first type of nutrients, said base having a sidewall with at least one first type nutrient opening therein through which nutrients of the first type in the container may flow into the first nutrient dispensing region. when the first nutrient basin is secured to the open end of the container and the container is being used to dispense the first type of nutrients; and
   a second nutrient basin having a second nutrient dispensing region and a base within said second nutrient dispensing region, said base configured to removably secure the second nutrient basin to said open end of said container to configure the container for dispensing the second type of nutrients, said base having a sidewall with at least one second type nutrient opening therein through which nutrients of the second type in the container may pass into the second nutrient dispensing region when the second nutrient basin is secured to the open end of the container and the container is being used to dispense the second type of nutrients, wherein said sidewall in second nutrient basin base includes a generally cylindrical attachment collar extending upwardly from a central area of said second nutrient dispensing region for securing said second nutrient basin to said container, said second nutrient basin base collar including a plurality of second type nutrient openings spaced around said collar, and wherein said sidewall in said first nutrient basin base also includes a generally cylindrical attachment collar extending upwardly from a central area of said first nutrient dispensing region for securing said first nutrient basin to said container, said first nutrient basin collar including a plurality of first type nutrient openings spaced from one another, said first type nutrient openings being smaller than said second type nutrient openings.

17. The dispensing apparatus as set forth in claim 16, wherein said first type of nutrients includes liquid nutrients and said second type of nutrients includes solid nutrients.

* * * * *